United States Patent [19]

Flannelly

[11] 4,420,134

[45] Dec. 13, 1983

[54] VIBRATION ISOLATOR WITH CRANK DRIVEN INERTIA BAR

[75] Inventor: William G. Flannelly, South Windsor, Conn.

[73] Assignee: Kaman Aerospace Corporation, Bloomfield, Conn.

[21] Appl. No.: 201,186

[22] Filed: Oct. 27, 1980

[51] Int. Cl.³ .............................................. F16F 15/00
[52] U.S. Cl. .................................... 248/559; 248/636; 248/638; 244/17.27
[58] Field of Search ............... 248/554, 559, 564, 636, 248/638; 244/17.25, 17.27

[56] References Cited

U.S. PATENT DOCUMENTS 1,973,510 9/1934 Schieferstein ...................... 248/559
4,088,042 5/1978 Desjardins et al. ................. 248/638
4,140,028 12/1979 Desjardins ...................... 244/17.27

FOREIGN PATENT DOCUMENTS 34092 8/1981 European Pat. Off. ......... 244/17.27
1026358 4/1960 United Kingdom ................ 248/559
599113 3/1978 U.S.S.R. ............................. 248/636
742649 6/1980 U.S.S.R. ............................. 248/559

Primary Examiner—Francis K. Zugel
Assistant Examiner—Michael F. Trettel
Attorney, Agent, or Firm—McCormick, Paulding & Huber

[57] ABSTRACT

A vibration isolator of the dynamic antiresonant type, for reducing the transmission of vibratory forces along a given line of action between two bodies having a component of vibration relative to one another along such line, includes an inertia bar driven by a crank and having its center of gravity so arranged as to allow the bar to be oriented at any angle to the line of action. This gives the isolator the capability of being designed to make it adaptable to the limitations of the space available between the vibrating bodies.

11 Claims, 3 Drawing Figures

VIBRATION ISOLATOR WITH CRANK DRIVEN INERTIA BAR

BACKGROUND OF THE INVENTION

This invention relates to passive vibration isolators of the type shown generally by U.S. Pat. No. 3,322,379, and deals more particularly with an improvement in such an isolator directed toward enhancing its utility by making it installable in a wide variety of different shapes of space which may exist between the two bodies with which it is used.

In addition to the general showing of U.S. Pat. No. 3,322,379, other forms of vibration isolators of the type with which this invention is concerned are shown by U.S. Pat. Nos. 3,441,238; 3,445,080; and 3,552,694. In each case illustrated by these patents the isolator serves to connect two bodies which vibrate relative to one another along a given line referred to herein as the line of action. The bodies are elastically restrained, by springs or the like, with regard to their movement along the line of action, and the isolator includes an inertia bar which moves in response to the relative motion between the two bodies. This motion of the inertia bar produces forces along the line of action which, at a certain "antiresonant" frequency, exactly balance, or almost exactly balance, the forces which the excited body would otherwise impose on the other body.

In some cases, where the relative motion of the two bodies occurs along a single line, a single isolator may be used to connect the two bodies. However, in other cases two or three isolators or sets of isolators may be used to accommodate components of vibration occurring along either two or three orthogonal axes.

One field of use of the isolators is in aircraft where, for example, a group of isolators may be used to isolate the rotor drive system of a helicopter from the remainder of the helicopter body. The helicopter rotor is usually driven at a fairly constant rpm and, therefore, the isolators may be tuned to have antiresonant frequencies equal to the rotor rpm or some multiple thereof. In all of the isolator constructions shown by the aforementioned patents the inertia bars are arranged with their longitudinal axes perpendicular to the line of action, but in aircraft installations the space available between the two vibrating bodies is often limited making it difficult in many cases to install such vibration isolators while keeping their inertia bars at the required perpendicular arrangement to the line of action.

This invention, therefore, provides an improved form of dynamic antiresonant vibration isolator wherein the orientation of the inertia bar longitudinal axis is independent of the orientation of the line of action, this accordingly allowing the isolator to be designed to fit many different space situations and to allow it to be installed in places where isolators of the previous designs could not be conveniently fitted.

Other objects and advantages of the invention will be apparent from the following detailed description of the preferred embodiments thereof.

SUMMARY OF THE INVENTION

The invention resides in a vibration isolator for use with two bodies which are movable relative to one another with elastic restraint along a given line of action. The isolator includes an elongated inertia bar connected intermediate its ends to one of the bodies for pivotal movement relative to that body about a first pivot axis, and a crank arm is fixed relative to the inertia bar and connected to the other of the two bodies at a point spaced from the first axis so that as the two bodies move relative to one another along the line of action the crank arm oscillates the inertia bar. The inertia bar has its center of gravity located substantially on the first pivot axis and the point at which the crank arm is connected to the other body is located approximately in a plane containing the first pivot axis and generally perpendicular to the line of action. Further, the inertia bar has its longitudinal axis at an angle to such plane, and this angle may be varied to suit the limitations of the space available for the isolator.

The invention also resides in the crank arm being connected to the other body by a link pivotally connected at its opposite ends to the crank arm and to the other body, by the inertia bar having two weights located on opposite sides of the first pivot axis, by the weights being adjustable toward and away from the first pivot axis, and by the crank arm being formed integral with the inertia bar.

DETAILED DESCRIPTION OF THE PREFERRED EMBODIMENTS

Figure 1:
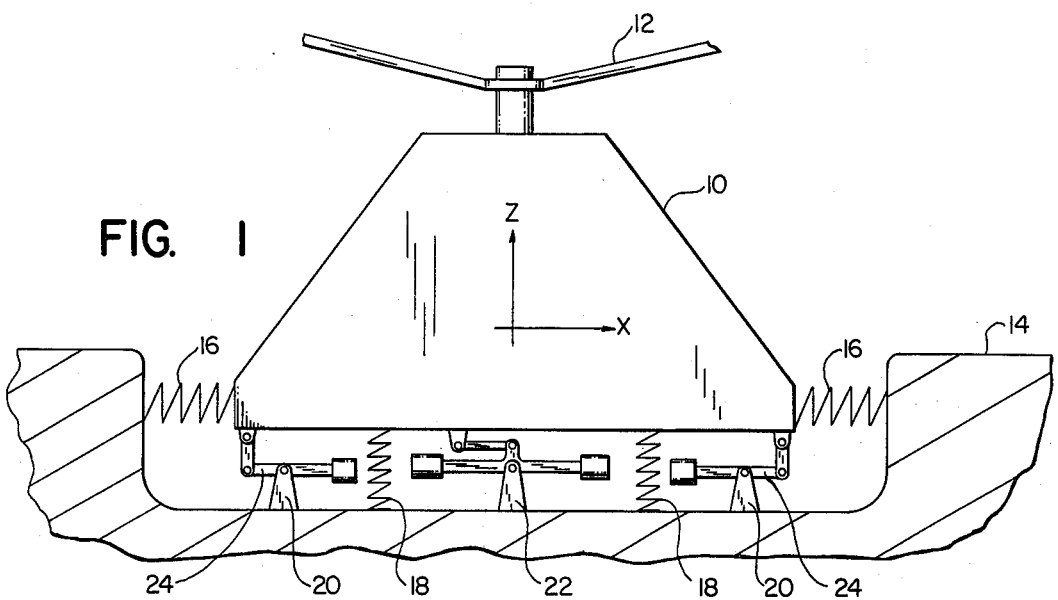
FIG. 1 is a schematic view, partly in vertical elevation and partly in vertical section, showing an installation employing a vibration isolator embodying the present invention.

FIG. 1 shows schematically a helicopter having a drive module 10 for driving a rotor 12. This module is separate from the airframe or remainder 14 of the helicopter and is elastically restrained for movement relative to the airframe 14 by suitable means such as the illustrated springs 16, 16 and 18, 18. Such springs or other elastic restraint means may be located at various different places between the module 10 and the airframe 14 and typically provide elastic restraint in three coordinate axes. For convenience of illustration, however, in FIG. 1 only two axes of relative motion have been shown, these being the X axis, elastic restraint for which is provided by the springs 16, 16, and the Z axis, elastic restraint for which is provided by the springs 18, 18.

In FIG. 1, the rotor drive module 10 is also connected to the airframe 14 through three vibration isolators 20, 20 and 22. The two isolators 20, 20 are similar to the ones shown in U.S. Pat. No. 3,322,379 and serve to isolate the airframe 14 from exciting forces of the module 10 occurring along the Z axis. For this purpose, each isolator 20 includes an inertia bar 24 arranged with its longitudinal axis generally perpendicular to the Z axis, thereby establishing the Z axis as the line of action or the line along which the isolators 20, 20 exert their isolating influence. In connection with the isolators 20, 20 the springs 18, 18 provide the required elastic restraint of the module 10 with regard to movement of it relative to the airframe 14 along the Z axis.

With regard to isolation along the X axis of FIG. 1 it will be noted that the use of an isolator such as either of the two isolators 20, 20 for this purpose would require the isolator's inertia bar to be arranged in a vertical plane perpendicular to the X axis, and the space available between the module 10 and airframe 14 would make such an arrangement of the inertia bar difficult. Therefore, the isolator 22 of FIG. 1, which deals with vibratory forces along the X axis has, in accordance with the invention, a different construction from that of the isolators 20, 20. As shown best in FIG. 2, the isolator 22 consists of an elongated inertia bar 26 which is connected intermediate its ends to the airframe 14 for pivotal movement relative to the airframe about a first pivot axis 28. The inertia bar in turn consists of an elongated member 30 carrying two weights 32, 32 located on opposite sides of the pivot axis. The member 30 is threaded at its opposite ends and the weights 32, 32 are adjustable along its length, by means of nuts 34, 34 threadably engaging the member, to tune the isolator to the particular frequency of vibration with which it is to be used. That is, moving the weights toward or away from the pivot axis 28 varies the antiresonant frequency of the isolator.

An important aspect of the invention is that the center of gravity of the inertia bar 26 at least substantially coincides with the pivot axis 28. Therefore, in the case illustrated by FIG. 2, the two weights 32, 32 are of the same mass and they are positioned so that each has its own center of gravity located the same distance S from the pivot axis 28.

Figure 2:
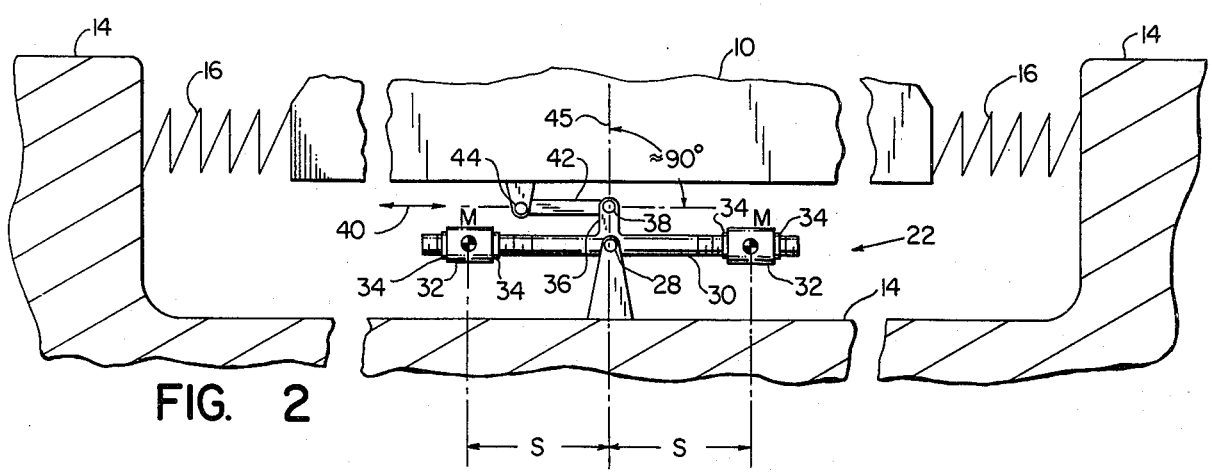
FIG. 2 is an enlarged view showing the isolator of FIG. 1 which embodies this invention, the other isolators and their associated springs of FIG. 1 being omitted for clarity.

A crank 36 is fixed relative to the inertia bar 26 for oscillating the inertia bar about the pivot axis 28 in response to oscillation of the crank's outer end. The fixing of the crank arm 36 to the inertia bar may be accomplished in various different ways, and as shown in FIG. 2 it is integrally formed with the member 30.

At its outer end, as indicated at 38, the crank 36 is connected to the module 10 so as to be oscillated in response to movement of the module 10 in the X direction indicated by the arrow 40. The connection between the module 10 and the crank arm 38 may be made in various different ways but in the preferred and illustrated case includes a link 42 having one end pivotally connected to the crank arm 36 at the point 38 for pivotal movement of the link relative to the crank about a second axis parallel to the axis 28 and having its other end connected to the module 10 at the point 44 for pivotal movement of the link relative to the body about a third axis also parallel to the axis 28.

A requirement of the isolator 22, in keeping with the invention, is that the point 38 at which the crank arm 36 is connected to the module 10 be located substantially in a plane 45 perpendicular to the line of action 40 and containing the pivot axis 28. Thus, in the arrangement of FIG. 2 the inertia bar is arranged generally horizontal and the crank 38 generally vertical. The same isolating action will be obtained, however, regardless of the orientation of the inertia bar 26 relative to the crank 36 so that if space limitations require it, the inertia bar 26 of FIG. 2 may be arranged at some angle about the pivot axis 28 other than that shown.

Figure 3:
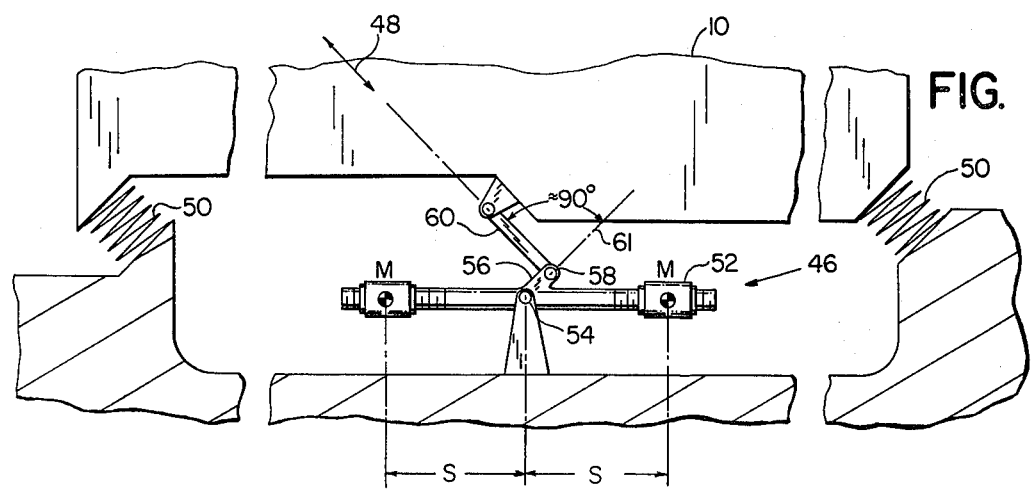
FIG. 3 is a view similar to FIG. 2 but shows an isolator having its line of action oriented differently from that of the isolator of FIG. 2.

The independence of the orientation of the inertia bar relative to the orientation of the crank arm is illustrated, for example, by the isolator 46 shown in FIG. 3. This isolator 46 is substantially similar to the isolator 22 of FIG. 2 except for the fact that it is adapted for use in isolating forces occurring along a differently oriented line of action represented by the arrow 48. Springs 50, 50 or other suitable means provide an elastic restraint between the module 10 and the airframe 14 in the direction of the line of action 48. The inertia bar 52 of the isolator 46 is arranged in a horizontal condition as in FIG. 2, and is supported for rotation relative to the airframe 14 about a first pivot axis 54. The crank 56 is arranged so that the point 58 at which it is connected to the module 10, by the link 60, is located in a plane 61 containing the first pivot axis 54 and substantially perpendicular to the line of action 48. This, therefore, means that the crank 56 has a different angular relation to the inertia bar 52 than has the crank 36 with the inertia bar 26 of FIG. 2, but the effectiveness of the isolator 46 in isolating forces occurring along the line of action 48 is the same as that of the isolator in isolating forces occurring along the line of action 40.

What is claimed is:

1. A vibration isolator for use with two bodies movable relative to one another with elastic restraint along a given line of action, said isolator comprising an elongated inertia bar connected intermediate its ends to one of said bodies for pivotal movement relative to said one body about a first pivot axis, a crank arm fixed relative to said inertia bar and connected to the other of said two bodies at a point spaced from said first axis, said point at which said crank arm is connected to said other body being located approximately in a plane containing said first pivot axis and generally perpendicular to said line of action so that relative movement between said two bodies along said line of action causes rotation of said inertia bar about said first pivot axis, said inertia bar being arranged with its longitudinal axis at an angle to said plane, and said inertia bar having a center of gravity located substantially on said first pivot axis.

2. A vibration isolator as defined in claim 1 further characterized by said crank arm being connected to said other of said bodies through a link having one end pivotally connected to said other body and its other end pivotally connected to said crank arm at said second point.

3. A vibration isolator for use with two relatively movable bodies, said isolator comprising a means elastically restraining movement of said two bodies relative to one another along a given line of action, an elongated inertia bar connected intermediate its ends to one of said bodies for pivotal movement relative to said one body about a first pivot axis, a crank arm fixed relative to said inertia bar and connected to the other of said two bodies at a point spaced from said first axis, said point at which said crank arm is connected to said other body being located approximately in a plane containing said first pivot axis and generally perpendicular to said line of action so that relative movement between said two bodies along said line of action causes rotation of said inertia bar about said first pivot axis, said inertia bar being arranged with its longitudinal axis at an angle to said plane, and said inertia bar having a center of gravity located substantially on said first pivot axis.

4. A vibration isolator as defined in claim 3 further characterized by said crank arm being connected to said other of said bodies through a link having one end pivotally connected to said other body and its other end pivotally connected to said crank arm at said second point.

5. A vibration isolator for connecting two bodies having a component of vibration relative to one another along a given line of action fixed relative to one of said bodies, said isolator comprising means elastically restraining movement of one of said two bodies relative to the other in either direction along said line of action from a neutral position of said one body relative to the other, an elongated inertia bar, means connecting said inertia bar at a given point intermediate its ends to said one body about a first pivot axis, a crank arm fixed relative to said inertia bar, and means connecting said crank arm at a point spaced from said first pivot axis to said other body for pivotal movement of said crank arm relative to said other body about a second pivot axis parallel to said first pivot axis, said first and second pivot axes being so arranged that the common plane containing them is generally perpendicular to said line of action when said one body is in said neutral position relative to said other body, said inertia bar being arranged so that its longitudinal axis is at an angle about said first pivot axis to said common plane, and said inertia bar having a center of gravity located substantially on said first pivot axis.

6. A vibration isolator as defined in claim 5 further characterized by said first pivot axis being fixed relative to said one body and to said inertia bar, and said means connecting said crank arm to said other body including a link between said other body and said crank arm, said link having one end pivotally connected to said crank arm for movement relative to said crank arm about said second pivot axis and which second pivot axis is fixed relative to both said crank arm and said link, and means pivotally connecting the other end of said link to said other body for movement of said link relative to said other body about a third pivot axis fixed relative to both said other body and said link and which third pivot axis is parallel to said first and second pivot axes.

7. A vibration isolator as defined in claims 1, 3 or 5 further characterized by said means elastically restraining movement of one of said two bodies relative to the other comprising at least one spring interposed between said two bodies.

8. A vibration isolator as defined in claims 1, 3 or 5 further characterized by said inertia bar including two weights located on opposite sides of said first pivot axis.

9. A vibration isolator as defined in claims 1, 3 or 5 further characterized by said inertia bar comprising an elongated member which is pivotally connected to said one body for pivotally movement relative to said one body about said first pivot axis, and two separate weights carried by said elongated member and located on opposite sides of said first pivot axis.

10. A vibration isolator as defined in claims 1, 3 or 5 further characterized by said inertia bar comprising an elongated member which is pivotally connected to said one body for pivotal movement relative to said one body about said first pivot axis, two separate weights carried by said elongated member and located on opposite sides of said first pivot axis, and means for adjustably positioning each of said two weights along the length of said elongated member.

11. A vibration isolator as defined in claims 1, 3 or 5 further characterized by said crank arm being integral with said inertia bar.

* * * * *